United States Patent Office 2,993,064
Patented July 18, 1961

2,993,064
METHOD FOR ADJUSTING THE COMPOSITION OF ALUMINUM SOAPS
Jack J. Bulloff, Dayton, Ohio, assignor to The Commonwealth Engineering Company of Ohio, Dayton, Ohio, a corporation of Ohio
No Drawing. Original application Mar. 21, 1955, Ser. No. 495,770. Divided and this application Aug. 6, 1958, Ser. No. 756,498
2 Claims. (Cl. 260—414)

This invention relates to methods for adjusting the composition of aluminum soaps More particularly, the invention relates to methods for adjusting the free fatty acid to aluminum ratio of aluminum soaps.

The aluminum soaps are commonly prepared from an aqueous solution of an alkali metal, usually sodium, soap resulting from the saponification of a fatty acid with alkali metal hydroxide, and an aqueous solution of an aluminum salt. Such soaps are frequently contaminated with varying amounts of the fatty acid used in the saponification end of unreacted aluminum hydroxide.

It is desirable to provide the aluminum soaps in pure form or to adjust and control the amounts of free fatty acid and unreacted aluminum hydroxide associated therewith in order to better adapt the soaps to use as gelling agents, thickeners, flatting or waterproofing agents, and so on.

One object of this invention is to provide a simple, efficient method for obtaining a substantially pure aluminum di-soap from a crude soap contaminated with unreacted aluminum hydroxide and/or free fatty acid.

Another object is to provide a method for adjusting and controlling the amount of aluminum hydroxide contained in an aluminum soap produced under conditions such that aluminum hydroxide as such is a component of the soap composition.

A further object is to provide a method for adjusting and controlling the amount of free fatty acid contained in an aluminum soap produced under conditions resulting in a soap having free fatty acid admixed therewith.

An additional object is to convert pure soap to mono- and tri-soap, as desired.

These and other objects are accomplished by the present invention in accordance with which aluminum soaps are treated with aqueous acid and/or aqueous alkali solutions in appropriate sequence and of concentrations such that at least some of the aluminum hydroxide and/or at least some of the free fatty acid present in an impure soap is removed, or controlled amounts of aluminum hydroxide and/or fatty acid are formed in situ in the soap.

I have observed that aluminum hydroxide is more soluble in aqueous acid solutions than are the aluminum soaps; that aluminum di-soaps are decomposed, in relatively concentrated acid solution, into fatty acids and aluminum salts; that fatty acids form alkali metal soaps with alkali metal hydroxides more readily than do the aluminum soaps, and that in relatively concentrated solutions of alkali metal hydroxides, the aluminum di-soaps are decomposed to aluminum hydroxide and soluble alkali metal soap.

The method of this invention, for purifying crude aluminum soap containing unreacted aluminum hydroxide and free fatty acid in undesired amounts is based on the foregoing observations.

Thus, when the soap contains unreacted aluminum hydroxide in an amount larger than is desirable, the hydroxide is eliminated or the amount thereof present is reduced by leaching the crude soap in a dilute aqueous solution, e.g. a solution having a pH of 4.0 to 6.5, until at least a portion of the hydroxide is dissolved out of the soap.

If the ratio of aluminum to free fatty acid in a crude di-soap is to be reduced, the crude soap is leached or washed with a more concentrated solution of the acid, e.g., a solution of pH 1.0 to 3.5, this treatment resulting in decomposition of the di-soap into fatty acids and an alkali metal salt of aluminum, the latter being dissolved out, so that the ratio of fatty acid to aluminum hydroxide is correspondingly reduced.

Or it may be desired to eliminate free fatty acid from the crude soap, or to reduce the concentration of the free acid in the soap. In that event, in accordance with this invention, the crude soap is leached with a dilute aqueous alkaline solution, for example, an aqueous solution of alkali metal hydroxide, preferably sodium hydroxide, having a pH of 7.5 to 9.0, a sodium soap of the free acid being formed in situ in the aluminum soap and dissolved out.

In order to decompose an aluminum di-soap to aluminum hydroxide and a soluble sodium soap of the fatty acid, thereby obtaining a soap richer in aluminum and containing less combined fatty acid than the starting soap, the latter is treated with a relatively concentrated aqueous solution of alkali metal hydroxide, preferably sodium hydroxide, having a pH of 9.5 to 11.0.

On the other hand, if it is desired to form aluminum hydroxide and/or free fatty acid in situ in a substantially pure soap prepared under special conditions such that the soap contains no or only small amounts of aluminum hydroxide and/or free fatty acid, this also may be accomplished by treating the soap with aqueous alkaline or acid solution. For instance, the treatment of a pure aluminum di-soap with an aqueous solution of sodium hydroxide results in an increase in the aluminum (in the form of hydroxide) content of the soap, the reaction

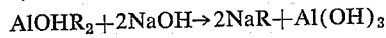
$$AlOHR_2 + 2NaOH \rightarrow 2NaR + Al(OH)_3$$

taking place. Treatment of the aluminum soap with aqueous acid solution, such as hydrochloric acid, results in the formation of free fatty acid in situ in the soap, the reaction proceeding as follows:

$$AlOHR_2 + 3HCl \rightarrow AlCl_3 + HR$$

The fatty acid present in the crude soap or formed in situ therein corresponds to the acid saponified to obtain the sodium soap to be reacted with the aluminum salt in making the aluminum soap.

In carrying out the present method, the crude aluminum soap is suspended in the appropriate acid or alkaline solution, preferably after preliminary wetting with water, and the mass is stirred, at ordinary temperature, until the soap has the predetermined composition. By selection of the acid and alkali concentrations of the treating solutions and use of the solution in appropriate predetermined sequence either in the same or in separate treating stages, it is possible to obtain, from a soap containing initially both aluminum hydroxide and free fatty acid, a substantially pure di-soap or one containing such relatively small amounts of the contaminants compared to the crude soap as may be desirable, or to form predetermined amounts of aluminum hydroxide and/or fatty acid in situ in a substantially pure soap. The treating time with the particular solution is determined by the end object in view, that is, the composition desired for the final soap and is continued, at ordinary temperatures, until the desired composition for the soap is attained. The treatment with the aqueous acid or alkaline solution is carried out with turbulent stirring of the mass comprising the soap and aqueous acid or alkaline solution.

The following examples are illustrative of specific embodiments of the invention, it being understood that these examples are not intended as limitative.

Example I

Aluminum di-2-ethylhexanoate was prepared by pouring sodium 2-ethylhexanoate solution containing a 50% molar excess of sodium hydroxide into a 10% excess of 10% aluminum sulfate solution at room temperature. The dried soap contained 8.17% aluminum by weight, gave a sharp X-ray diffraction pattern indicating the absence of aluminum hydroxide and the presence of only a trace of free 2-ethylhexanoic acid. It showed only free hydroxyl group infra-red absorption, indicating that it was pure aluminum di-2-ethylhexanoate. The absence of acid was further confirmed by extraction with iso-octane and by measurement of gel yield using 1-limonene as the test material (yield maximum corresponds to 8.17% of aluminum). The absence of hydroxide was further confirmed by measuring the monomolecular film yield of a precisely weighted quantity of the soap by McBain's method. The soap was not fractionated by exposure to a vacuum of 0.6 micron.

Twenty gms. of this pure di-soap were suspended in 200 ccs. of water, and 6.10 ml. of 1N sodium hydroxide were added after the soap had been thoroughly dispersed. The mass was stirred for four hours. The suspended soap was then collected on a porous filter, dried and analyzed. It had an aluminum content of 13.2% (the reaction $AlOHR_2 + 2NaOH \rightarrow 2NaR + Al(OH)_3$ where R=2-ethylhexanoate produced sufficient aluminum hydroxide to increase the aluminum content to 13.24%), an infra-red absorption spectra wherein bound hydroxyl [due to $Al(OH)_3$] was as strongly exhibited as free hydroxyl [due to $Al(OH)R_2$]. The composition of the product was that of the so-called "mono-soap" of commerce, i.e., a soap known to be a mixture of aluminum hydroxide and of di-soap. The X-ray powder pattern of the mono-soap was very diffuse.

Example II

Twenty gms. of the pure di-soap of Example I were suspended in 200 ccs. of water, 6.10 ml. of 1N HCl were added, and the treatment and separation were performed as in Example I. The product contained 5.10% aluminum (resulting from the reaction

$$AlOHR_2 + 3HCl \rightarrow AlCl_3 + 2HR$$

R being 2-ethyl hexanoate). Its X-ray pattern is somewhat diffuse, but became sharp on fusion. The infra-red absorption indicated bound hydroxyl and the iso-octane solubles were as expected on the basis of the analysis. The soap was fractionated in vacuo into 2-ethylhexanoic acid and the di-soap. The composition of the soap corresponded to that of the so-called "tri-soap" of commerce, i.e., the soap known to be a mixture of di-soap and fatty acid.

Example III

An aluminum ethylhexanoate containing two and one-fifth moles of fatty acid (combined and free) per mole of aluminum was prepared by pouring 10% alum solution in 5% stoichiometric excess rapidly into a solution containing 2-ethylhexanoic acid saponified with a 35% excess of lye. Twenty gms. of the soap (fatty acid to aluminum ratio: 2.20) were suspended in water as in Examples I and II and stirred with 1.2 ml. of 1N sodium hydroxide solution. The product soap was recovered for analysis. It had an aluminum content corresponding to a fatty acid to aluminum ratio of 2.0.

Example IV

An aluminum ethylhexanoate of fatty acid to aluminum ratio 1.7 was prepared by slowly titrating 10% aluminum chloride solution into a 5% solution of sodium 2-ethylhexanoate containing 2.5% excess free alkali. Twenty gms. of this soap were leached with 1.8 ml. of 1N HCl for two hours, 1.0 ml. of 1N HCl were added, stirring was continued for one hour, after which 0.35 ml. of 1N HCl were added and stirring maintained for an additional hour. The recovered product soap had a fatty acid to aluminum ratio of 2.0.

Example V

A commercial "di-soap" containing 5% aluminum hydroxide, 88% mixed aluminum distearate and dipalmitate and 71% mixed free stearic and palmitic acids by weight was suspended in water to provide 100 gallons of a slurry containing 108 lbs. of soap by weight. The slurry was stirred for about 12 hours to hydrate the 2-gibbsite in the soap. There were then added 23.5 lbs. of 10% HCl over a period of six hours, after which one pound of flake caustic soda was added, and the mass was stirred for about 12 hours longer.

The soap obtained was essentially a pure aluminum di-soap of the mixed acids, i.e., a substantially pure mixture of aluminum di-stearate and aluminum di-palmitate.

Example VI

The procedure of Example V was repeated except that the leaching with the sodium hydroxide solution preceded the leaching with the acid solution.

As will be apparent from the examples given, the method of the invention may be utilized either to reduce the aluminum hydroxide and/or free fatty acid content of aluminum soaps containing those impurities as produced, or to form desired amounts of aluminum hydroxide and/or fatty acid in situ in pure or substantially pure aluminum di-soaps. Thus the method of the invention is designed to adjust the aluminum to free fatty acid ratio whether by reducing the amounts thereof initially present or by formation of desired amounts of either or both of the ingredients in situ in an initially pure di-soap. The aluminum soap may be treated by the present method as a finishing step in the preparation thereof regardless of the method by which the soap is made, and for correcting unavoidable errors in making soaps by any non-equilibrium or non-stoichiometric method.

Various changes and modifications may be made in practicing the invention as specifically illustrated herein without departing from the spirit and scope thereof. Therefore, it is to be understood that it is not intended to limit the invention except as defined in the appended claims.

This application is a division of Serial No. 495,770, filed March 21, 1955 and now abandoned.

What is claimed is:

1. A method of converting a substantially pure aluminum di-2-ethylhexanoate soap to a mono-soap containing a mixture of the di-soap and aluminum hydroxide which comprises treating the pure di-soap with a relatively dilute aqueous sodium hydroxide solution, with continued stirring and at room temperature, until aluminum hydroxide is formed in situ in the soap, said conversion being carried out in the proportionate amounts of reactants as follows: 20 grams of aluminum di-2-ethylhexanoate soap in 200 cc. of water, and 6.1 ml. of 1-N sodium hydroxide, the reaction mixture being stirred and reacted for approximately 4 hours, and thereafter filtering the resultant reaction mass to separate and recover the mono-soap.

2. A method of decreasing the fatty acid to aluminum ratio content of crude aluminum di-2-ethylhexanoate soap containing free fatty acid and unreacted aluminum hydroxide admixed therewith, which comprises treating the crude di-soap with relatively dilute aqueous sodium hydroxide solution, at room temperature and with continued stirring, until water-soluble sodium soap is formed by reaction between at least a portion of the free fatty acid and sodium hydroxide with corresponding decrease in the fatty acid to aluminum ratio to 2, said method consisting in dissolving 20 grams of said aluminum di-2-ethylhexanoate having a fatty acid to aluminum ratio of 2.20 in 200 cc. of water and 1.2 ml. of 1-N sodium hydroxide solution, and stirring the mixture for approximately 4 hours, thereafter filtering the resultant aluminum di-2-ethylhexanoate having a fatty acid to aluminum ratio of 2 from the soluble sodium soap, and drying the same.

References Cited in the file of this patent

UNITED STATES PATENTS

| | | |
|---|---|---|
| 2,417,071 | Gebhart et al. | Mar. 11, 1947 |
| 2,447,064 | Gebhart et al. | Aug. 17, 1948 |
| 2,477,296 | Georgi | July 26, 1949 |
| 2,570,990 | Southern et al. | Oct. 9, 1951 |

OTHER REFERENCES

Elliott: "The Alkaline-Earth and Heavy Metal Soaps," Reinhold Pub. Co. (1946), pages 182–184.

Rueggeberg: "Use of Aluminum Soaps and Other Fuel Thickeners in Gelling Gasolines," Jour. of Physics and Colloid Chem., vol. 52 (1948), pages 1449–51.